US012583143B2

(12) United States Patent
Chesaux et al.

(10) Patent No.: US 12,583,143 B2
(45) Date of Patent: Mar. 24, 2026

(54) SHEET PROCESSING MACHINE

(71) Applicant: BOBST MEX SA, Mex (CH)

(72) Inventors: Stéphane Chesaux, Echallens (CH); Carles Sagués Mitjana, Villars-sous-Yens (CH)

(73) Assignee: BOBST MEX SA, Mex (CH)

( * ) Notice: Subject to any disclaimer, the term of this patent is extended or adjusted under 35 U.S.C. 154(b) by 162 days.

(21) Appl. No.: 18/257,169

(22) PCT Filed: Dec. 13, 2021

(86) PCT No.: PCT/EP2021/085477
§ 371 (c)(1),
(2) Date: Jun. 13, 2023

(87) PCT Pub. No.: WO2022/128911
PCT Pub. Date: Jun. 23, 2022

(65) Prior Publication Data

US 2024/0091970 A1 Mar. 21, 2024

(30) Foreign Application Priority Data

Dec. 17, 2020 (EP) .................................... 20214895

(51) Int. Cl.
*B65H 29/00* (2006.01)
*B26D 7/18* (2006.01)
(Continued)

(52) U.S. Cl.
CPC ......... *B26D 7/1818* (2013.01); *B65H 29/003* (2013.01); *B65H 2404/10* (2013.01); *B65H 2701/1311* (2013.01)

(58) Field of Classification Search
CPC ...... B26D 7/18; B26D 7/1818; B26D 7/1854; B65H 2301/543; B65H 2301/44712;
(Continued)

(56) References Cited

U.S. PATENT DOCUMENTS 2,198,385 A 4/1940 Harrold
2,956,805 A 10/1960 Golding
(Continued)

FOREIGN PATENT DOCUMENTS

CN 109070379 A 12/2018
CN 110546094 A 12/2019
(Continued)

*Primary Examiner* — Luis A Gonzalez
(74) *Attorney, Agent, or Firm* — Bookoff McAndrews, PLLC

(57) ABSTRACT

A sheet processing machine with a transfer mechanism for moving sheets along a handling direction of the sheet processing machine and with a waste evacuation device (36) for releasing the sheets. The transfer mechanism comprises a sheet handling element (28) for moving a sheet, the sheet handling element (28) comprising at least one sliding element (54). The sheet handling element (28) is adapted to release the sheet when passing the waste evacuation device (36). The waste evacuation device comprises at least one alignment element (38) adapted to interact with the at least one sliding element (54) for minimizing deformation of the sheet handling element (28) when passing the waste evacuation device (36).

12 Claims, 2 Drawing Sheets

(51) Int. Cl.
*B65H 5/00* (2006.01)
*B65H 29/04* (2006.01)

(58) Field of Classification Search
CPC .. B65H 29/003; B65H 29/041; B65H 29/044; B65H 29/585; B65H 29/18; B65H 5/008; B65H 5/085; B65H 2701/1311; B65H 2404/3421; B62H 2601/24
See application file for complete search history.

(56) References Cited

U.S. PATENT DOCUMENTS

| | | | | |
|---|---|---|---|---|
| 6,412,379 | B1 | 7/2002 | Turusaki | |
| 2012/0285306 | A1 | 11/2012 | Weibelt | |
| 2021/0138754 | A1 * | 5/2021 | Cuennet | B65H 29/16 |

FOREIGN PATENT DOCUMENTS

| | | | | | |
|---|---|---|---|---|---|
| CN | 111542480 | A | 8/2020 | | |
| DE | 102009000218 | A1 | 7/2010 | | |
| DE | 102015226328 | A1 | 6/2017 | | |
| GB | 867093 | A | 5/1961 | | |
| JP | 2019510649 | A | 4/2019 | | |
| WO | 2017153056 | A1 | 9/2017 | | |
| WO | WO-2018192685 | A1 * | 10/2018 | | B26D 5/007 |

* cited by examiner

SHEET PROCESSING MACHINE

CROSS-REFERENCE TO RELATED APPLICATION(S)

This application is a National Stage Application under 35 U.S.C. § 371 of International Application No. PCT/EP2021/085477, filed on Dec. 13, 2021, which claims priority to European Application No. 20214895.3, filed on Dec. 17, 2020, the entireties of which are incorporated herein by reference.

The invention relates to a sheet processing machine with a waste evacuation device.

Sheet processing machines, also known as converting machines, are used in the packaging industry for processing raw materials, e.g. cardboard, paper or foils, into intermediate or finished products, typically in the form of sheets. Converting operations can e.g. include printing, cutting, creasing, blanking, stamping and/or folding-gluing. Typically, the individual operations are done in subsequent processing stations of the sheet processing machine with the sheets being conveyed from one processing station to the subsequent one by a transfer mechanism.

E.g. in die-cutting machines, so-called blanks are obtained from the sheets made of raw material. Blanking operations e.g. involve breaking nicks in sheets by blanking tools, wherein the nicks have been formed in a previous processing step, thereby pushing the blanks downwards into a piling area for collecting the blanks. Accordingly, after the blanking operation, waste sheets remain connected to the transfer mechanism and need to be removed in a subsequent waste evacuation station (also known as waste ejection station).

Modern sheet processing machines enable a high throughput of sheets, i.e. a high processing speed. To achieve such processing speeds, it is desirable to release the waste sheets from the transfer mechanism in a dynamic manner, i.e. it is desired to release the waste sheets without the need to stop the transfer mechanism.

However, the high processing speeds result in high forces acting on the components of the transfer mechanism, e.g. centrifugal forces at a turn of the transfer mechanism. The larger the size of the sheets to be processed, the more pronounced this effect becomes. Therefore, for large sheet sizes, known systems involve stopping the transfer mechanism and removing the waste sheet with an additional moving element. This limits the available maximum processing speed and requires a complex mechanism.

WO 2017/153056 A1 discloses an ejector member for on-the-fly waste removal in a sheet processing machine. The ejector member comprises a comb being configured to switch between a first, low-speed position and a second, high-speed position. In the high-speed position, the center of the comb is set back to compensate for deformations of sheets to be processed and for deformations of parts of a transfer mechanism. However, the ejector member and a sheet processing machine with such a mechanism requires a complex and cost-intensive design.

The object of the invention is to provide a simple mechanism for waste ejection in a sheet processing machine, preferably allowing for high processing speeds even for large sheet sizes.

The object of the invention is solved by a sheet processing machine with a transfer mechanism for moving sheets along a handling direction of the sheet processing machine and with a waste evacuation device for releasing the sheets. The transfer mechanism comprises a sheet handling element for moving a sheet, the sheet handling element comprising at least one sliding element. The sheet handling element is adapted to release the sheet when passing the waste evacuation device. The waste evacuation device comprises at least one alignment element adapted to interact with the at least one sliding element for minimizing deformation of the sheet handling element when passing the waste evacuation device.

The invention is based on the idea to provide a simple and cheap mechanical means for maintaining the shape of the sheet handling element when passing the waste evacuation device. A sliding interaction between the at least one sliding element of the transfer mechanism and the at least one alignment element of the waste evacuation device can minimize the wear of these components while allowing for a reliable stabilization of the shape of the sheet handling element, thereby allowing for high processing speeds of the sheet processing machine.

By minimizing the deformation of the sheet handling element, mechanical stress in the sheet handling element can be reduced, thereby minimizing the risk of damaging and/or breaking the sheet handling element, especially when using high processing speeds.

The at least one sliding element preferably is arranged at a leading edge of the sheet handling element. With the term "leading edge" the part of the sheet handling element is denoted which is arranged at the front of the sheet handling element relative to a handling direction of the sheets being processed in the sheet processing machine. By providing the at least one sliding element at the leading edge, the at least one alignment element of the waste evacuation device can interact with the sliding element before any other parts of the sheet handling element come into contact the waste evacuation device. This allows to simplify the shape and size of the alignment element and ensures that any deformation of the sheet handling element can be minimized or even prevented as soon as the sheet handling element comes into contact with the waste evacuation device.

The leading edge especially defines a length direction of the sheet handling element and the at least one sliding element is especially arranged between a first end and a second end of the sheet handling element along the length direction, the second end being opposite to the first end along the length direction.

Accordingly, especially deformations along the leading edge of the sheet handling element can be prevented or at least minimized.

The sheet handling element especially has a length along the length direction of 106 cm or more, e.g. the length direction has a length of from 140 to 170 cm.

The length of the sheet handling element along the length direction especially corresponds to the size of the sheets to be processed by the sheet processing machine. Accordingly, the sheet processing machine according to the invention especially allows for processing sheets of large size as the sheet handling element can be stabilized by the at least one alignment element of the waste evacuation device.

To further minimize the extent of deformations of the sheet handling element or prevent such deformation at all, the sheet handling element can comprise a plurality of sliding elements, the sliding elements especially being arranged symmetrically around the middle of the length direction of the at least one sheet handling element.

With other words, the plurality of sliding element are especially arranged such that the sheet handling element essentially has a mirror plane in the center of and perpendicular to the length direction in respect to the arrangement of the sliding elements.

In one variant, the sliding elements are arranged equidistant to each other along the length direction of the leading edge. This provides an especially uniform distribution of the locations at which the at least one alignment element can interact with the plurality of the sliding elements.

Preferably, the at least one sliding element is a roller. By using a roller as sliding element, any forces acting on the sliding element can be translated into a circular motion of the roller, thereby eliminating or at least minimizing the risk of damaging the sliding element when interacting with the at least one alignment element.

The sheet handling element can comprise at least one gripping element being displaceable between a sheet gripping state and a sheet releasing state, the at least one gripping element especially being arranged at a trailing edge of the sheet handling element, the trailing edge being opposite to the leading edge.

The at least one gripping element can be responsible for securing the sheet when being moved by the transfer mechanism through the processing stations of the sheet processing machine along the handling direction.

Accordingly, the at least one sheet handling element can especially be a gripper bar, preferably a gripper bar comprising a plurality of gripping elements.

Analogously to the sliding elements, the gripping elements can be arranged symmetrically around the middle of the length direction of the at least one sheet handling element to allow for gripping the sheet in an evenly distributed manner.

By arranging the at least one gripping element at the opposite side of the sheet handling element relative to the at least one sliding element, the at least one gripping element does not interfere with the at least one sliding element. Further, the only contact between the sheet handling element and the sheet can easily be accomplished by means of the at least one gripping element, i.e. the sheet does not need to be in contact with other parts of the sheet handling element at all.

The at least one alignment element of the waste evacuation device can comprise a sliding surface for interaction with the at least one sliding element. With other words, the direction of movement of the at least one sliding element, and therefore of the sheet handling element, can be at least partially defined by the course of the sliding surface.

Preferably, the sliding surface has a curved shape.

E.g., the sliding surface can be arranged such to be in line with a travel direction of the sheet handling element when passing the waste evacuation station. This means that the transfer mechanism can travel around a loop in which the sheet is moved along the handling direction by the sheet handling element for essentially one half of the loop and can travel back to a starting position without the sheet along a reverse direction for essentially the other half of the loop for gripping a next sheet to be processed. The sliding surface can be arranged at the turning point between the two halves of the loop at the waste evacuation device.

Preferably, the waste evacuation device comprises one alignment element for each sliding element of the sheet handling element, each alignment element being associated with one sliding element. Accordingly, each of the sliding elements being present at the sheet handling element can contribute in preventing or at least minimizing deformations of the sheet handling element when passing the waste evacuation device.

The at least one alignment element can be a cam. Cams are cheap and are available in a variety of sizes and shapes to provide a desired interaction between the at least one sliding element and the cam. Further, they can be designed such to minimize the needed space.

The waste evacuation device can further comprise a comb comprising a plurality of teeth. The comb is used to retain the waste sheet delivered by the transfer mechanism to the waste evacuation device while allowing the sheet handling element to pass by. Accordingly, the teeth of the comb are especially arranged such that the at least one gripping element of the at least one sheet handling element can pass the comb.

By minimizing the deformation of the sheet handling element, the waste evacuation device can use a comb with a fixed shape.

The transfer mechanism preferably moves the sheets from a loading station of the sheet processing machine to a waste evacuation station of the sheet processing machine comprising the waste evacuation device.

Preferably, the transfer mechanism comprises a plurality of sheet handling elements. This allows much faster processing speeds of the sheet processing machine.

Further advantages and features of the invention will become apparent from the following description of the invention and from the appended figures which show a non-limiting exemplary embodiment of the invention and in which:

FIG. 1 schematically shows a sheet processing machine according to the invention;

Figure 1:
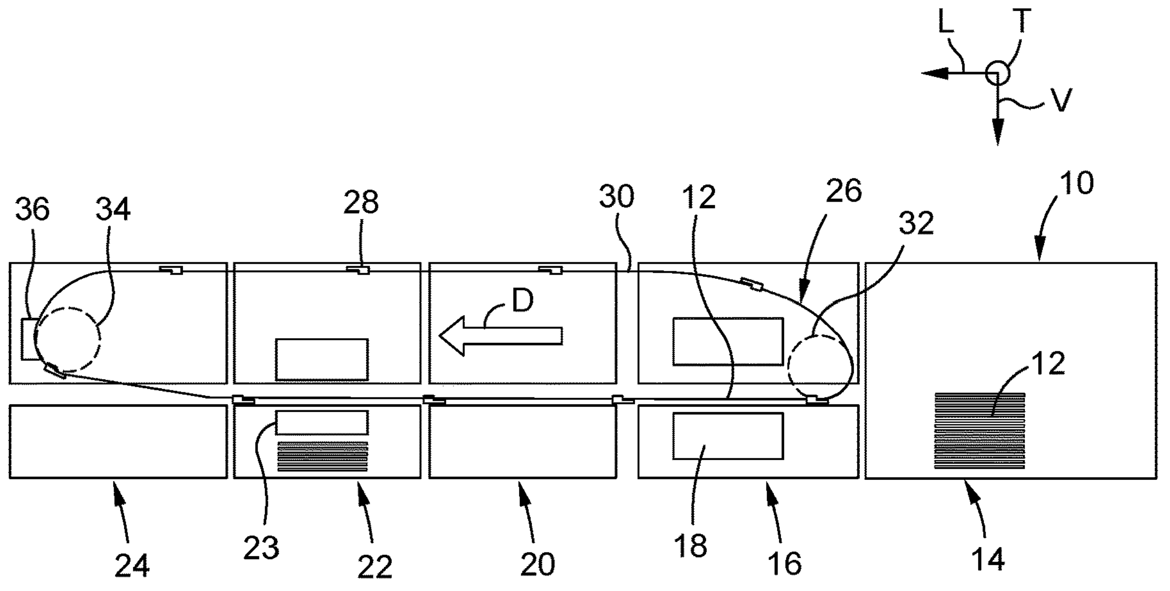

FIG. 1 schematically shows a sheet processing machine 10 making it possible to cut blanks from a succession of sheets 12. These blanks are usually intended to be subsequently folded and bonded to form packaging boxes. However, the sheets 12 might generally be made of e.g. paper, cardboard, foil, a composite material thereof or any other material routinely used in the packaging industry.

The sheet processing machine 10 comprises a series of processing stations that are juxtaposed but interdependent one another in order to form a unitary assembly. The processing machine 10 includes a loading station 14 followed by a cutting station 16 (also usually named punching station) comprising for example a die or platen press 18 where the sheets 12 are transformed by cutting, a waste removal station 20 wherein most of the waste parts are stripped, a blank separation station 22 (also usually named reception station) for separation of the blanks (or blanking operation) by means of a blanking tool 23 and a waste evacuation station 24 for removing the residual waste sheets of the punched sheets 12.

The number and nature of the processing stations may vary depending on the nature and the complexity of the converting operations to be carried out on the sheets 12.

The sheet processing machine 10 also has a transfer mechanism 26, which in the shown embodiment is a conveyor, to make it possible to individually move each sheet 12 from an outlet of the loading station 14 to the waste evacuation station 24.

The conveyor uses a series of sheet handling elements 28 that are mounted so as to be moveable by means of two loops of chains 30 one placed laterally on each side of the sheet processing machine 10. Each loop of chains 30 travels around a loop which allows the sheet handling elements 28 to follow a trajectory passing successively by the cutting station 16, the waste removal station 20, the blank separation station 22 and the evacuation station 24.

Each sheet handling element 28 travels for essentially the first half of its passage on an outward path in a substantially horizontal plane of passage between a driven wheel 32 and an idler wheel 34, and then for essentially the second half of its passage on a return path in the top portion of the sheet processing machine 10. Once returned to the driven wheel 32, each sheet handling element 28 is then able to grip a new sheet 12 at a front edge of the sheet 12.

In the shown embodiment, the sheet handling elements 28 are so-called gripper bars.

In FIG. 1, each processing station is illustrated in the form of two rectangles symbolizing respectively its top portion and its bottom portion that are positioned on each side of the plane of movement of the sheets 12.

In FIG. 1, a transverse (or lateral), longitudinal and vertical direction are indicated by the orthogonal spatial system (T, L, V).

The terms "upstream" and "downstream" are defined with reference to the direction of movement of sheets 12 in a handling direction as illustrated by the arrow Din FIG. 1.

The waste evacuation station 24 further comprises a waste evacuation device 36 for releasing sheets 12 having been moved from the loading station 14 to the waste evacuation station 24, i.e. for removing the waste sheets.

Figure 2:
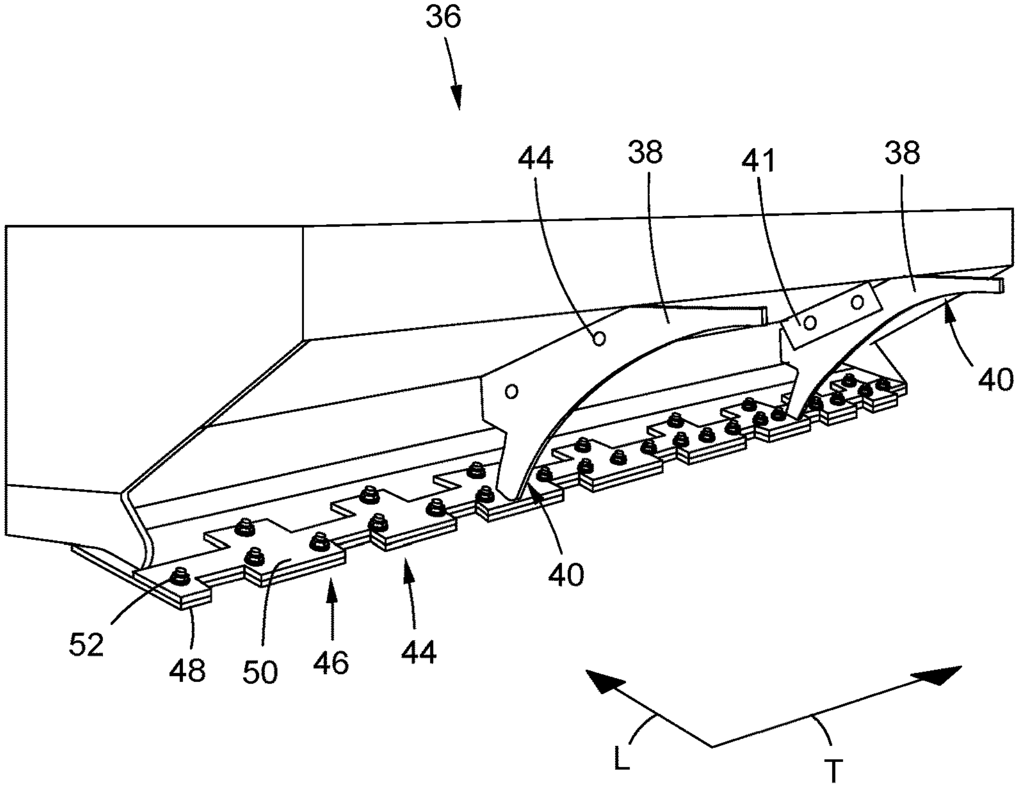
FIG. 2 shows a perspective view of a waste evacuation device of the sheet processing machine of FIG. 1.

FIG. 2 shows a perspective view of the waste evacuation device 36.

The waste evacuation device 36 comprises two alignment elements 38, each of the alignment elements 38 being a cam comprising a curved sliding surface 40.

The alignment elements 38 are securely mounted to a frame 41 by screws 42, i.e. the alignment elements 38 are fixed in their positions.

The waste evacuation device 36 further comprises a comb 44 with a plurality of teeth 46.

The comb 44 is formed out of a first sheet 48 and a second sheet 50 connected by a plurality of fixation elements 52. The first sheet 48 is made out of a plastic material for limiting the noise of a sheet impacting on the comb 44 while the second sheet 50 is made out of metal for providing sufficient mechanical strength of the comb 44. Of course, alternatively both the first sheet 48 and the second sheet 50 could be made out of plastic or out of metal as long as sufficient mechanical strength of the comb 44 is achieved.

Figure 3:
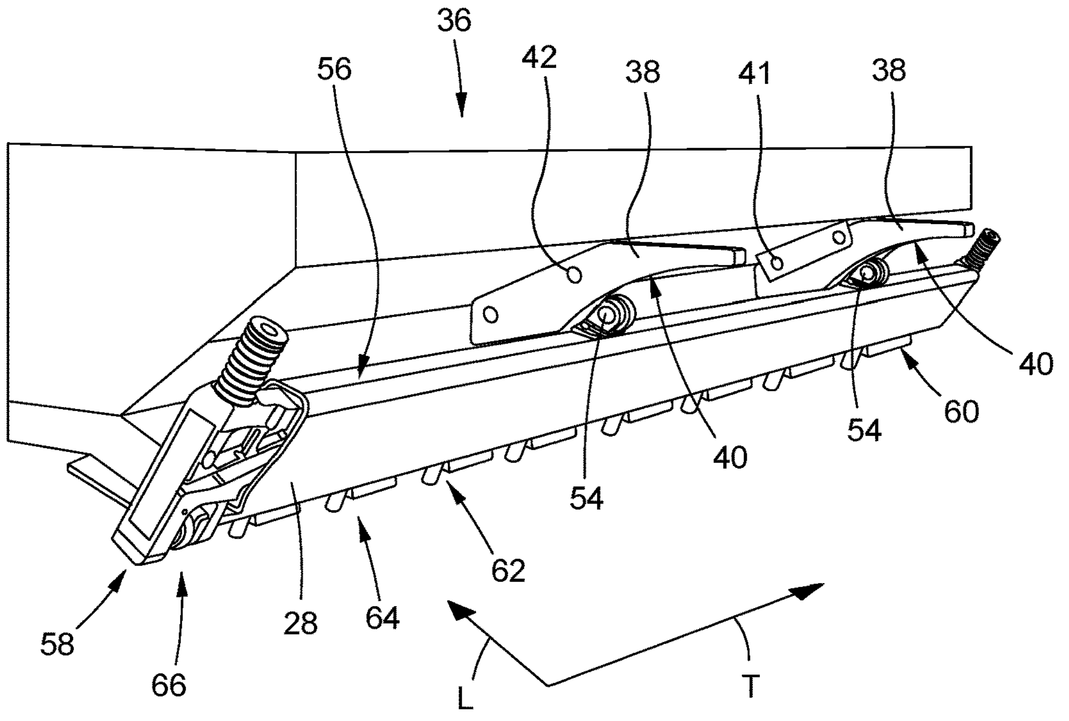
FIG. 3 shows the waste evacuation device of FIG. 2 when interacting with a sheet handling element.
Figure 4:
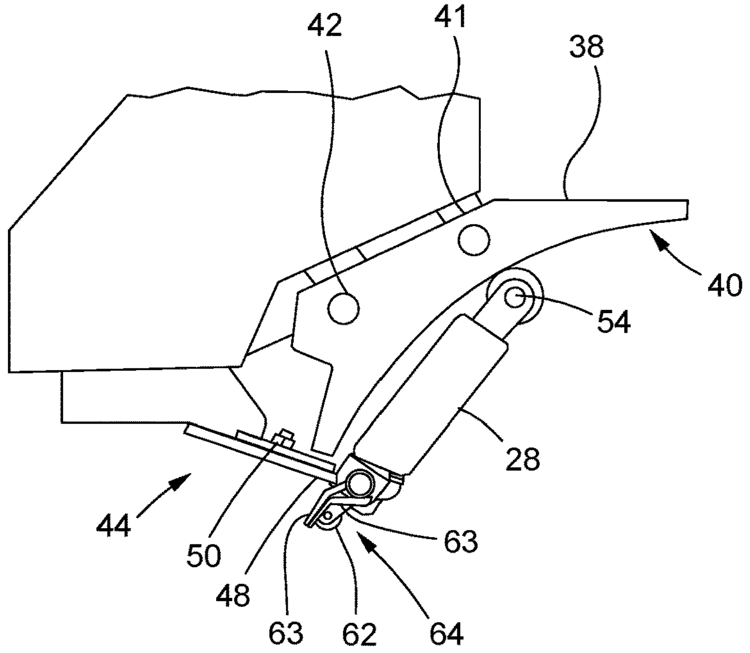
FIG. 4 shows a cut through the waste evacuation device of FIG. 3.

FIGS. 3 and 4 show the waste evacuation device 36 when one of the sheet handling elements 28 is passing the waste evacuation device 36.

The sheet handling element 28 has two sliding elements 54 which in the shown embodiments are rollers. Each of the sheet handling elements 28 is associated to one of the alignment elements 38 of the waste evacuation device 36.

More specifically, each of the sliding elements 54 is adapted to roll along the sliding surface 40 of the associated alignment element 38 when the sheet handling element 28 passes the waste evacuation device 36.

Of course, the sheet handling element 28 could in principle have only one or more than two sliding elements 54.

The sliding elements 54 are arranged at a leading edge 56 of the sheet handling element 28. The leading edge 56 defines a length direction of the sheet handling element 28, wherein the sliding elements 54 are arranged between a first end 58 and a second end 60 of the sheet handling element 28 at the leading edge 56.

The length direction extends along the transverse direction T and defines the size of the sheets 12 along the transverse direction T being manageable by the sheet processing machine 10.

Opposite to the leading edge 56, the sheet handling element 28 comprises a plurality of gripping elements 62 at a trailing edge 64 of the sheet handling element 28.

The gripping elements 62 are displaceable between a sheet gripping state and a sheet releasing state, wherein switching between these two states is done at the waste evacuation station 24 by interaction of an opening mechanism 66 of the sheet handling element 28 with a (not shown) opening cam of the waste evacuation device 36.

Each of the gripping elements 62 comprises two arms 63 which are pressed against each other in the gripping state, e.g. by a force applied by a (not shown) spring mechanism of the sheet handling element 28. In the sheet releasing state, the arms 63 of the gripping element 62 are being moved apart of each other to allow a sheet 12 to be placed between the arms 63. When displaced back to the gripping state, the sheet 12 is accordingly pressed between the arms 63 and becomes fixed.

Both the sliding elements 54 and the gripping elements 62 are arranged symmetrically around the middle of the length direction of the leading edge 56 and the trailing edge 64, respectively.

In the following, the mode of action of the waste evacuation device 36 will be described in more detail.

During operation of the sheet processing machine 10, the gripping elements 62 of the sheet handling element 28 are used to grip a front edge of the sheet 12 at an outlet of the loading station 14 (see FIG. 1), i.e. the gripping elements 62 are brought into their gripping state.

The sheet 12 is then moved by the movement of the sheet handling element 28 along the handling direction D through the processing stations, resulting in a waste sheet being gripped by the gripping elements 62 when the sheet handling element 28 reaches the waste evacuation station 24 with the waste evacuation device 36.

As described above, the chain 30 of the transfer mechanism 26 defines an outward path and a return path. The transition between the outward path and the return path is defined by passing a turning point defined by the idler wheel 34 at the waste evacuation device 36.

Therefore, the sheet handling element 28 is drawn along the turning point by the movement of the chain 30.

Due to the high processing speed of the sheet processing machine 10, this results in a centrifugal force acting on the sheet handling element 28. The centrifugal force would result in a deformation of the sheet handling element 28. Specifically, the sheet handling element 28 would deform into a bowed shape, i.e. the sheet handling element 28 would not anymore be straight along the length direction.

However, when the sheet handling element 28 passes the waste evacuation device 36, the sliding elements 54 of the sheet handling element 28 come into contact with the associated curved sliding surfaces 40, thereby preventing or at least minimizing the deformation of the sheet handling element 28 when passing the waste evacuation device 36.

With other words, the interaction between the sliding elements 54 of the sheet handling element 28 and the alignment elements 38 act like a stiffening member of the sheet handling element 28, ensuring that the sheet handling element 28 remains essentially straight along the length direction when passing the waste evacuation device 36.

As the sheet handling element 28 is passing the waste evacuation device 36, the gripping elements 62 at the trailing edge 64 pass between the teeth 46 of the comb 44.

Accordingly, a sheet 12, more precisely the waste sheet, held by the gripping elements 62 will impact on the teeth 46 when the trailing edge 64 passes the comb 44.

At the same time, the gripping elements 62 are displaced into their sheet releasing state by an interaction of the opening mechanisms 66 with (not shown) opening cams of the waste evacuation device 36.

Accordingly, when the sheet 12 impacts on the comb 44, the sheet 12 is retained while the sheet handling element 28 can pass the waste evacuation device 36. The retained sheets 12, which are waste, can be collected in the waste evacuation station 24 and discarded.

The sheet processing machine according to the invention allows to prevent or at least minimize the deformation experienced by the sheet handling element 28 in a simple and cheap manner. This enables the sheet processing machine 10 to release the waste sheets dynamically, i.e. without any stops of the transfer mechanism 26, even in the case of relatively large sheets 12. Further, no moving parts are needed in the waste evacuation device 36 for removing the waste sheets.

The invention claimed is:

1. A sheet processing machine with a transfer mechanism for moving sheets along a handling direction of the sheet processing machine and with a waste evacuation device for releasing the sheets, the transfer mechanism comprising at least one sheet handling element for moving a sheet, the at least one sheet handling element comprising at least one sliding element, the at least one sheet handling element being adapted to release the sheet when passing the waste evacuation device, wherein the at least one sheet handling element includes a leading edge, and wherein the leading edge defines a length direction of the at least one sheet handling element and the at least one sliding element is arranged between a first end and a second end of the at least one sheet handling element along the length direction, the second end being opposite to the first end along the length direction, and the waste evacuation device comprising at least one alignment element with a sliding surface adapted to interact with the at least one sliding element for minimizing deformation of the at least one sheet handling element when passing the waste evacuation device.

2. The sheet processing machine according to claim 1, wherein the at least one sliding element is arranged at the leading edge of the at least one sheet handling element.

3. The sheet processing machine according to claim 2, wherein the at least one sheet handling element comprises a plurality of sliding elements, the sliding elements especially being arranged symmetrically around a middle of a length direction of the at least one sheet handling element.

4. The sheet processing machine according to claim 3, wherein the sliding elements are arranged equidistant to each other along the length direction of the leading edge.

5. The sheet processing machine according to claim 2, wherein the at least one sheet handling element comprises at least one gripping element being displaceable between a sheet gripping state and a sheet releasing state, the at least one gripping element especially being arranged at a trailing edge of the at least one sheet handling element, the trailing edge being opposite to the leading edge.

6. The sheet processing machine according to claim 1, wherein the at least one sliding element is a roller.

7. The sheet processing machine according to claim 1, wherein the sliding surface has a curved shape.

8. The sheet processing machine according to claim 1, wherein the waste evacuation device comprises one alignment element for each sliding element of the at least one sheet handling element, each alignment element being associated with one sliding element.

9. The sheet processing machine according to claim 1, wherein the at least one alignment element is a cam.

10. The sheet processing machine according to claim 1, wherein the waste evacuation device further comprises a comb comprising a plurality of teeth.

11. The sheet processing machine according to claim 1, wherein the transfer mechanism moves the sheets from a loading station of the sheet processing machine to a waste evacuation station of the sheet processing machine comprising the waste evacuation device.

12. The sheet processing machine according to claim 1, wherein the transfer mechanism comprises a plurality of sheet handling elements.

* * * * *